United States Patent
Fry et al.

(10) Patent No.: US 11,005,646 B2
(45) Date of Patent: May 11, 2021

(54) BLOCKCHAIN STOCHASTIC TIMER TRANSACTION SYNCHRONIZATION

(71) Applicant: International Business Machines Corporation, Armonk, NY (US)

(72) Inventors: Jonathan Fry, Fishkill, NY (US); Christopher J. Penny, Saratoga Springs, NY (US); James Demarest, Rensselaer, NY (US); Marc Bergendahl, Rensselaer, NY (US); Jean Wynne, Nassau, NY (US); Christopher J. Waskiewicz, Rexford, NY (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 15/987,700

(22) Filed: May 23, 2018

(65) Prior Publication Data

US 2019/0363873 A1 Nov. 28, 2019

(51) Int. Cl.
*H04L 9/06* (2006.01)
*G06Q 30/08* (2012.01)
*G06Q 40/04* (2012.01)

(52) U.S. Cl.
CPC .......... *H04L 9/0637* (2013.01); *G06Q 30/08* (2013.01); *G06Q 40/04* (2013.01)

(58) Field of Classification Search
CPC ....... H04L 9/0637; G06Q 30/08; G06Q 40/04
See application file for complete search history.

(56) References Cited

U.S. PATENT DOCUMENTS

| | | | | |
|---|---|---|---|---|
| 8,275,020 | B1* | 9/2012 | Frost | H04L 9/16 375/130 |
| 10,491,578 | B1* | 11/2019 | Hebert | H04L 63/068 |
| 2009/0048985 | A1* | 2/2009 | Kuhnle | G06Q 40/00 705/400 |
| 2013/0262257 | A1* | 10/2013 | Filppula | G06Q 30/08 705/26.3 |

(Continued)

FOREIGN PATENT DOCUMENTS

| | | | | |
|---|---|---|---|---|
| DE | 28 15 895 | A1 * | 10/1979 | G06F 1/04 |
| WO | 2017187398 | A1 | 11/2017 | |

OTHER PUBLICATIONS

Evan Duffield et al., Transaction Locking and Masternode Consensus: A Mechanism for Mitigating Double Spending Attacks, Document version: 2, published Sep. 22, 2014.

(Continued)

*Primary Examiner* — Scott C Anderson

(57) ABSTRACT

A blockchain may be used as a stochastic timer. The posting of a blockchain solution for verification may be a trigger that determines an event schedule. Because the only entity that knows when the solution will be posted is the solving entity, the solving entity may be rewarded with the ability to potentially exploit this knowledge. However, because the solving of a blockchain is a competitive process, there is a risk that if the solving entity retains the solution for greater exploitation, then another entity will post the solution and therefore gain the benefit. A blockchain stochastic timer can thus provide the necessary incentive for entities to invest computational resources into blockchain solutions.

19 Claims, 10 Drawing Sheets

(56) References Cited

U.S. PATENT DOCUMENTS

| | | | |
|---|---|---|---|
| 2016/0112200 A1* | 4/2016 | Kheterpal | H04L 9/0643 380/28 |
| 2016/0350749 A1* | 12/2016 | Wilkins | G06Q 20/382 |
| 2017/0339112 A1* | 11/2017 | Hoyer | H04W 4/029 |
| 2018/0336552 A1* | 11/2018 | Bohli | G06Q 20/389 |

OTHER PUBLICATIONS

Siamak Solat et al., ZeroBlock: Timestamp-Free Prevention of Block-Withholding Attack in Bitcoin, arXiv:1605.02435v3 [cs.CR] May 3, 2017.

Anonymous, "Is Proof-Of-Work decentralized clock?—Bitcoin Exchange", Feb. 13, 2018 (Feb. 13, 2018), XP055608402, Retrieved from the Internet: URL:https://bitcoin.stackexchange.com/questions/70744/is-proof-of-work-simply-a-decentralized-clock, retrieved on Jul. 24, 2019.

International Search Report issued in the corresponding International Application No. PCT/EP2019/062137, dated Aug. 1, 2019.

Jager, "How to Build Time-Lock Encryption", International Association for Cryptologic Research, vol. 20150921:115232, Sep. 21, 2015, pp. 1-32.

Marco: "Blockchain time and Heisenberg Uncertainty Principle", Science and Information Conference, Intelligent Computing, Jul. 11, 2018 (Jul. 11, 2018), pp. 849-859, XP055608389, Retrieved from the Internet: URL:https://webusers.imj-prg.fr/-ricardo.p erez-marco/publications/articles/Heisenberg.pdf.

Trubetskoy, "Blockchain Proof-of-Work is a Decentralized Clock", Jan. 23, 2018 (Jan. 23, 2018), XP055608397, Retrieved from the Internet: URL:https://grisha.org/blog/2018/01/23/exp laining-proof-of-work/ retrieved on Jul. 2, 2019, pp. 1-5.

\* cited by examiner

US 11,005,646 B2

BLOCKCHAIN STOCHASTIC TIMER TRANSACTION SYNCHRONIZATION

TECHNICAL FIELD

This application generally relates to transaction synchronization and timing and more particularly, to transaction synchronization based on a stochastic timer generated from a blockchain.

BACKGROUND

A ledger is commonly defined as an account book of entry, in which transactions are recorded. A distributed ledger is a ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Blockchains typically operate on a Proof-of-Work principle or some similar principle in which the creation of the hash code that "solves" a particular block in the block chain is computationally difficult to generate, but relatively easy to verify by network peers. Many cryptocurrencies operate using blockchains. In a cryptocurrency network, the generation of a block solution rewards the first solver with an issue of the cryptocurrency, with the quest for a solution being a competitive process across all nodes of the network. Thus, there is a direct financial incentive to invest computational resources to solving blocks within a cryptocurrency network.

Solving the work function requires compute cycles and electricity which are not free. For non-cryptocurrency implementations of blockchain technology there is little incentive to solve the work function. Nodes therefore need an incentive to solve blocks other than wanting a robust transaction record.

A further problem is blockchain networks with small numbers of nodes are vulnerable to attack. Large numbers of nodes in distributed clusters are more desirable for robust performance.

What is needed is an improved system and method for operating a blockchain that overcomes these limitations.

SUMMARY

A blockchain may be used as a stochastic timer. The posting of a blockchain solution for verification may be a trigger that determines an event schedule. Because the only entity that knows when the solution will be posted is the solving entity, the solving entity may be rewarded with the ability to potentially exploit this knowledge. However, because the solving of a blockchain is a competitive process, there is a risk that if the solving entity retains the solution for greater exploitation, then another entity will post the solution and therefore gain the benefit. A blockchain stochastic timer can thus provide the necessary incentive for entities to invest computational resources into blockchain solutions.

One example embodiment may provide a method that includes one or more of generating a block solution in a blockchain network, providing a stochastic timing signal from the blockchain network to a secondary network in response to the block solution being generated, and triggering one or more events in one or more processes of the secondary network from the stochastic timing signal.

Another example embodiment may provide a system that includes a blockchain network that requires a block solution to process blockchain transactions into a block of a blockchain and a secondary network that executes one or more processes. The blockchain network may be configured to provide a stochastic timing signal to the secondary network in response to a block solution being generated within the blockchain network.

A further example embodiment may provide a non-transitory computer readable medium comprising instructions, that when read by a processor, cause the processor to perform one or more of generating a block solution in a blockchain network, providing a stochastic timing signal from the blockchain network to a secondary network in response to the block solution being generated, and triggering one or more events in one or more processes of the secondary network from the stochastic timing signal.

DETAILED DESCRIPTION

Figure 1:
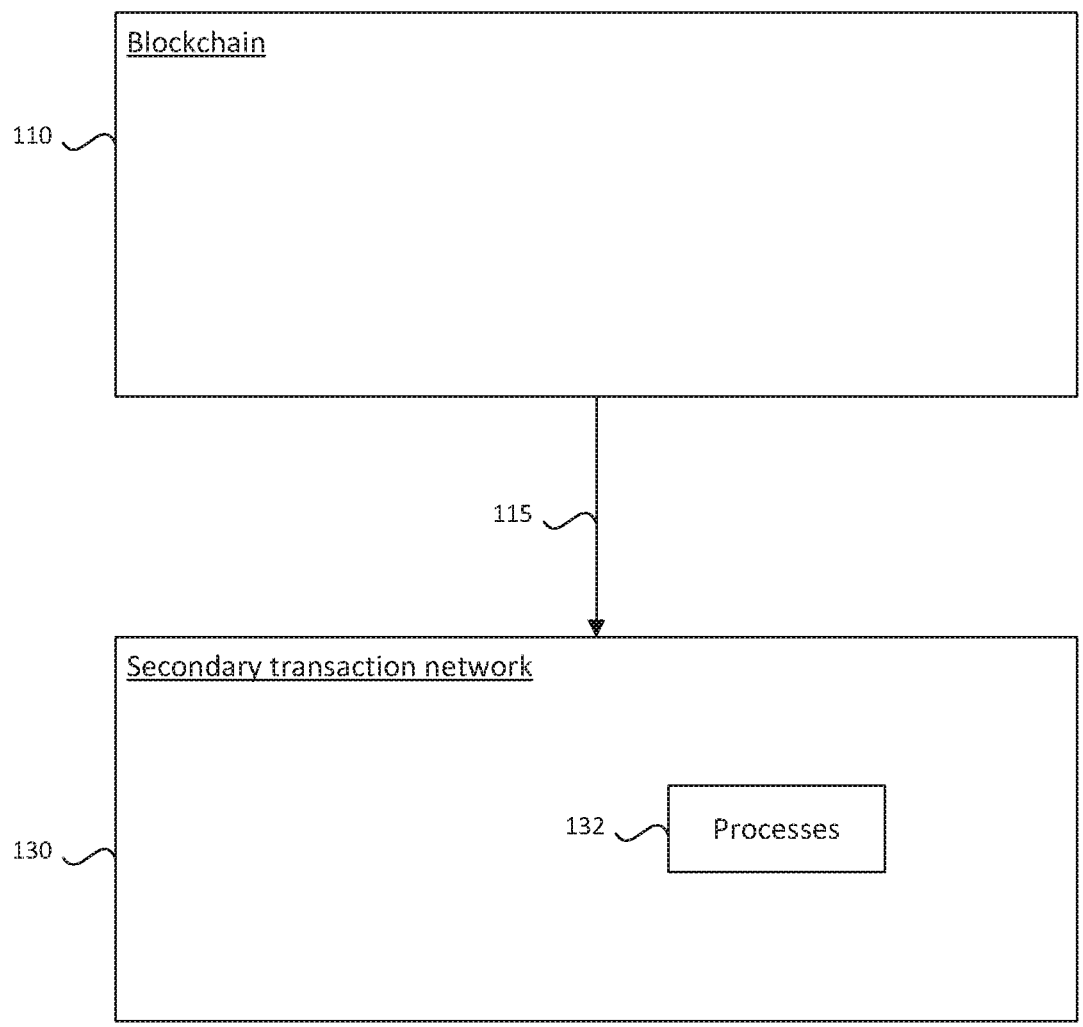
FIG. 1 illustrates a network diagram blockchain network that provides stochastic timing signals to a secondary network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which use a blockchain network to provide stochastic signals to a transaction network. There will also be described systems and methods that seek to externalize or subsidize the cost of solving the work function of a blockchain.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1 illustrates a logic network diagram of stochastic timer system based on a blockchain network according to example embodiments. Referring to FIG. 1, the system 100 includes a blockchain network 110. The blockchain network 110 may be similar to the network 200 of FIG. 2A and may operate as shown and described with reference to FIG. 2B, as described below. The blockchain network 110 may also be a permissioned blockchain network as shown and described below with reference to FIG. 3. Typically, the blockchain network 110 will include a plurality of client nodes that create transactions, peer nodes that process the transactions and a plurality of solving nodes (or mining nodes) which invest computational resources, e.g. compute cycles and power to process blocks for the blockchain. The specific details of the blockchain network 110 are not considered pertinent to the present embodiments and many forms of blockchain network will be suitable. Further, the specific type and nature of the transactions undertaken within the blockchain network is also not relevant for the broadest embodiments of the present disclosure. The blockchain network 110, in addition to its own internal operations, transactions, etc. may output stochastic signals 115 based on blockchain ticks.

The system 100 further includes a secondary transaction network 130. The secondary transaction network operates one or more processes 132. In the broadest form, the secondary transaction network 130 may be any network that requires a stochastic timing signal or some similar source of entropy. The secondary network 130 receives the blockchain ticks which triggers actions within the processes 132. One or more of the nodes of the blockchain network 110 may be participants in these processes 132. One or more participants of the processes 132 may be utilized in the blockchain network 110. The secondary network 130 may be largely independent and unrelated to the blockchain network 110 and only uses the blockchain network as a timer.

Figure 2A:
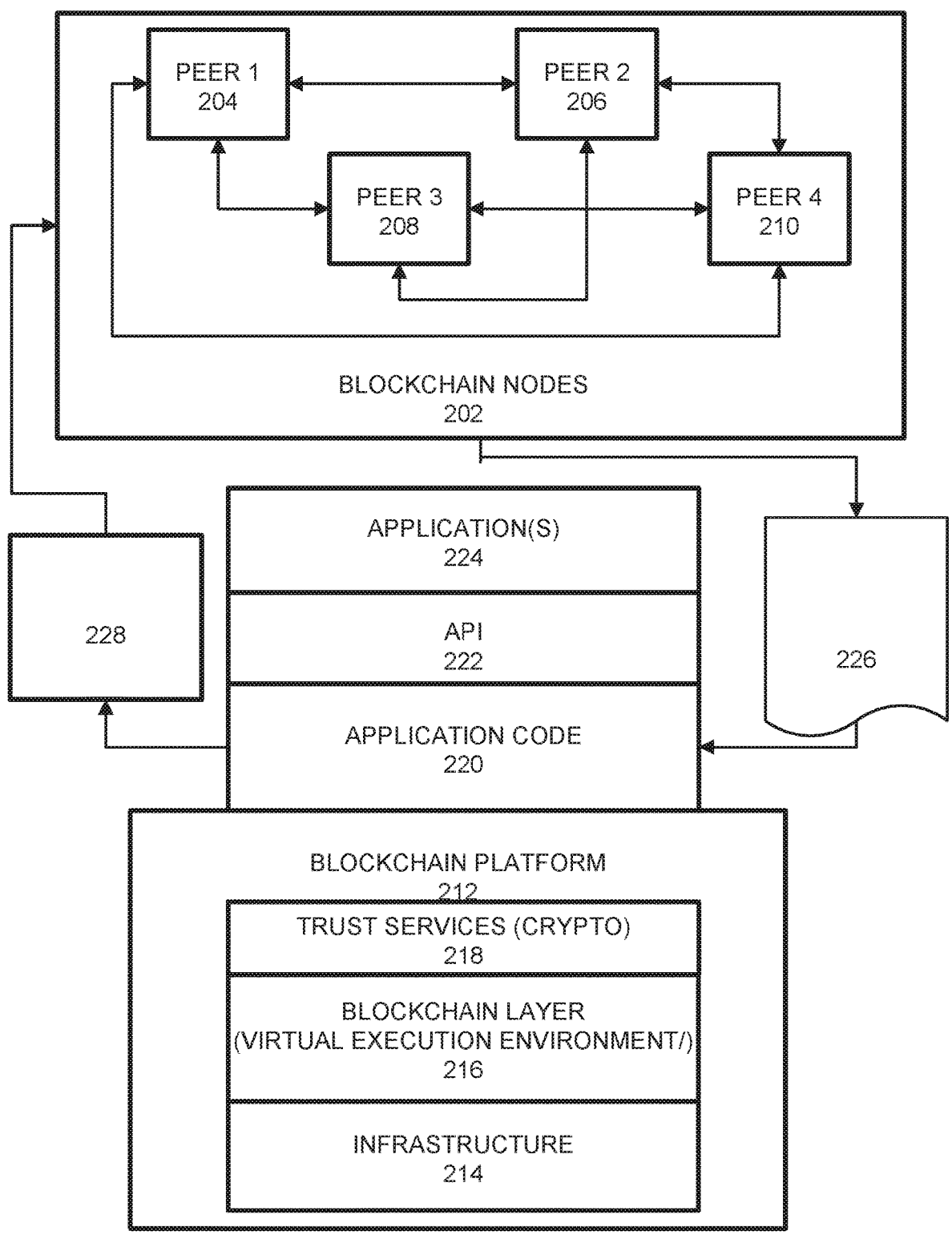
FIG. 2A illustrates an example peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, a transaction query 226, may be processed by one or more processing entities (e.g., virtual machines) included in the blockchain layer 216. The query result 228 may include details of a transaction, exchange, parties, etc. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, an example action could be "Update Release and Acquire Smart Contract" or "Commit Transactions." One function may be to "Submit Transactions for Validation" or "Provide Access To Requesting Entity," which may be provided to one or more of the nodes 204-210.

Figure 2B:
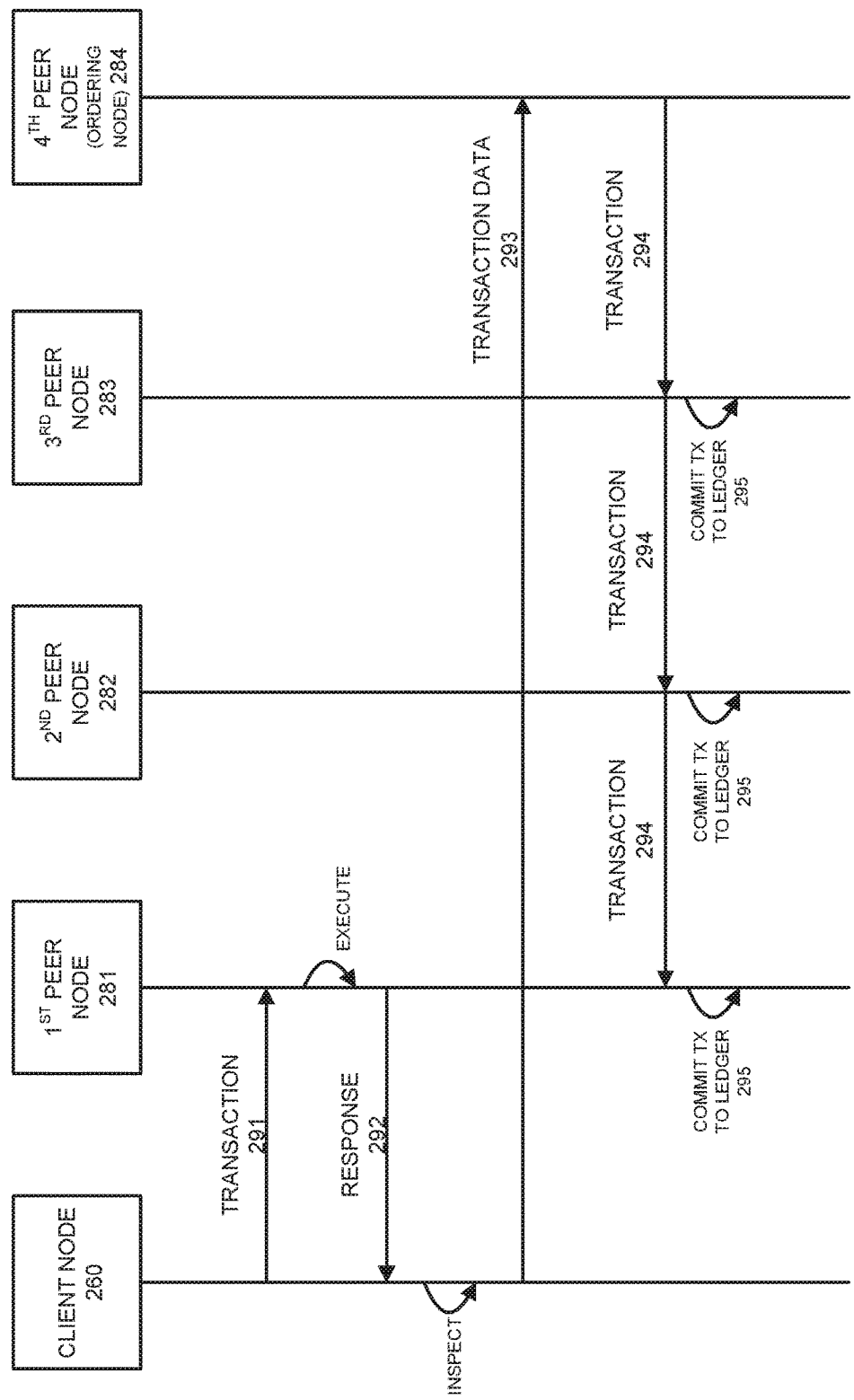
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/ verifies the endorsing peer signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peer signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
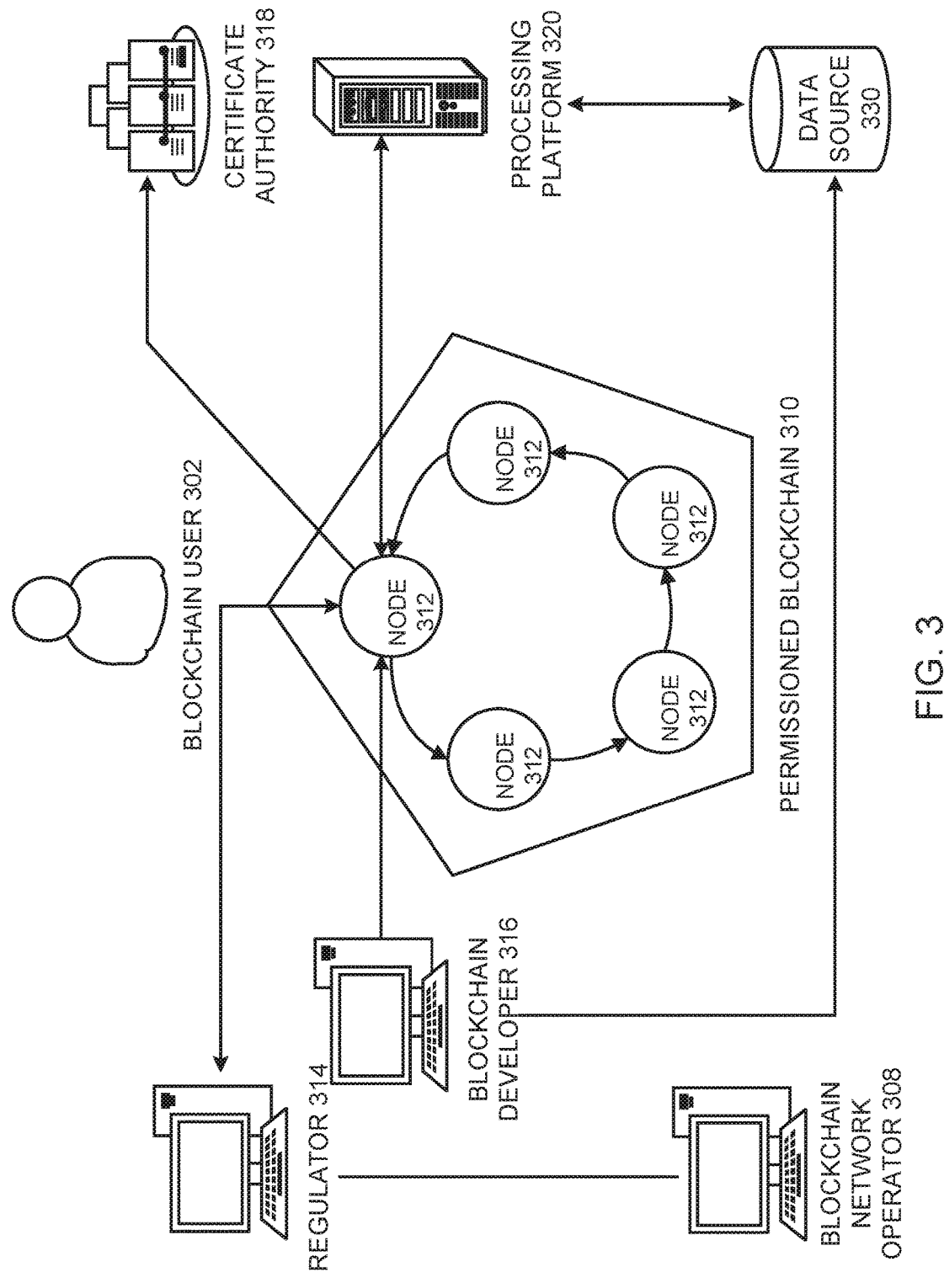
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Blockchains gain their immutability properties via cryptographic links, e.g. cryptographic hashes, to the previous block in the chain. The amount of work required to generate a cryptographic hash can vary dependent on the operating principles of different blockchain systems. Different methods include proof-of-work, proof-of-state or a consensus framework. In every case computational effort (computer cycles and power) is required to generate the cryptographic hash for the next block in the chain.

The process of generating the required cryptographic hash for the current block is considered to be "solving" the block.

The integrity of the blockchain system requires solving to be complex to undertake, yet relatively easy to verify. Blockchain systems use processing nodes, e.g. mining nodes, ordering nodes, etc. to process or "crunch" blocks to generate the cryptographic hashes. It can take considerable computational resources and energy to solve blocks and therefore the processing nodes must have an incentive for doing so. In cryptocurrency networks, when a node solves a block, the node is rewarded with an issue of new cryptocurrency, thus the node is paid for their effort. In some transaction blockchain systems, each transaction may have an associated fee paid by one or more of the transaction parties to the node that solves the block containing the transaction. Thus, the solving node is again paid for undertaking the proof of work. However, the benefits of a blockchain system as a Cryptographic Distributed Ledger mean that non-payment incentives may be required to motivate nodes to invest the computational resources required for solving blocks.

Solving a block is a random process. It is not known exactly when a block will be solved, nor which node will solve the block. However, given a certain number of processing nodes, a certain amount of computing power, and a certain cryptographic hash difficulty, the average time taken to solve a block can become predictable, though imprecise. If every block solution is considered as a "tick", then the blockchain system can be considered as a stochastic timer. As shown in FIG. 1, the blockchain system may be coupled with a secondary network that requires a stochastic timer input for running time based processes. More generally, the blockchain tick may be considered as a source of entropy and used as an input to a system that requires such.

Figure 4:
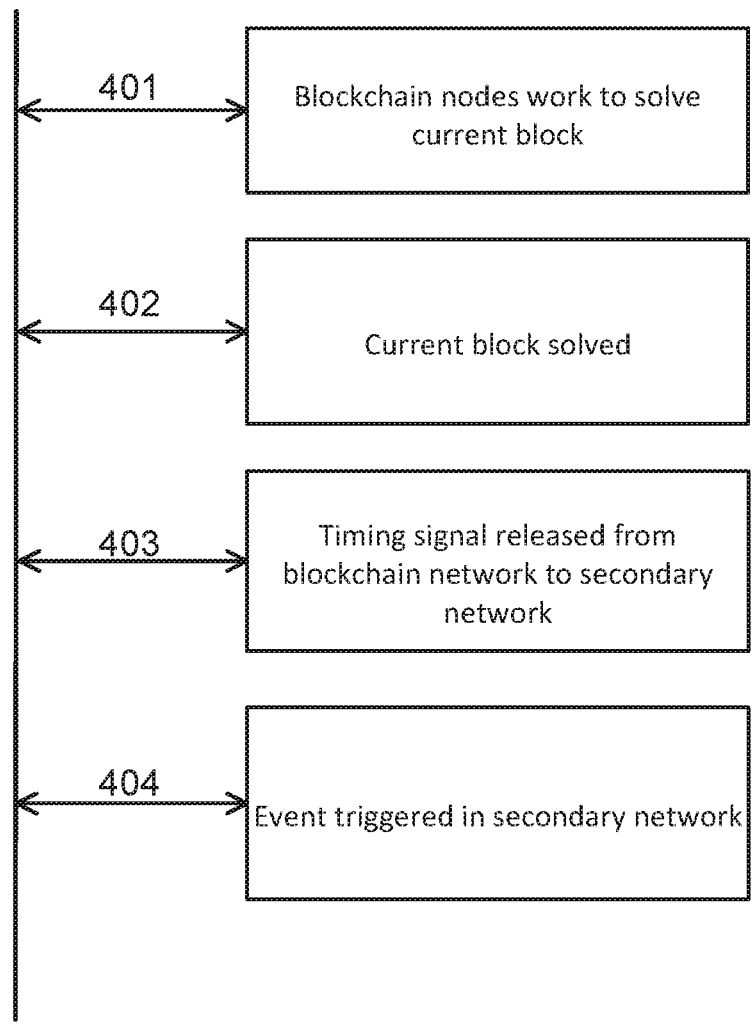
FIG. 4 illustrates a flow diagram of a process for using a blockchain as a stochastic timer, according to example embodiments.

The system 100 of FIG. 1 may operate in accordance with a process flow 400 depicted in FIG. 4. It may be assumed that in a general state, the blockchain network 110 is operating in parallel to the processes 132 of the secondary network 130. At step 401, one or more of the peer nodes attempt to solve the current block of the blockchain network 110 in accordance with the requirements of the blockchain network. As a consequence of the current block being indicated as solved 402, a signal is provided from the blockchain network 110 to the secondary transaction network 130 (step 403). The signal may be sent when the solving node releases the block solution for verification, or may be sent after the other nodes have verified the block solution and the block is incorporated into the blockchain. The process 132 receives the signal which triggers an action within the process 132 (step 404).

The participants of the processes 132 of the secondary network may be encouraged or required to provide computational resources to the blockchain network, i.e. to act as solving nodes for the blockchain network. In various embodiments, solving a block of the blockchain may grant the participant advantages within the processes 132 of the secondary network 130 over other participants of the processes 132. For example, knowledge of the timing of the processes 132 may be temporarily advantageous for a participant.

In one embodiment, an ordering node which provides central communications to the peer nodes of the blockchain network may also be responsible for providing the signal to the transaction network 130.

In one particular embodiment, the transaction network 130 may be an exchange such as an electronic securities exchange, currency exchange etc. The time based processes that operate within the exchange may be settlement of trades of stocks, currencies, etc. Conventional digital financial markets (Stock exchanges, currency exchanges) provide a high amount of liquidity for assets which is generally desirable. However, given millisecond quantitative trading capabilities and high powered computing, physical proximity to the marketplace as well as raw computing power gives certain players an unfair advantage in manipulating prices. Advantages may include, beating people to the buzzer, making and cancelling orders faster than a 3rd party can even post an order, and blocking the order. This can create instability in the market with prices of stock and currency varying much more rapidly than the underlying goods and services they represent. Furthermore, there are a finite number of ideal geographical locations to station computers relative to the exchange computers for maximum benefit for cross-exchange arbitrage. Entities will often pay to have their computers located as physically close to the central exchange server as possible to minimize any signal time of flight. Newcomers cannot easily "buy" their way in, limiting creative destruction, which severely limits growth in open markets.

Using a blockchain network to provide stochastic timing signals to the exchange network, transactions may be finalized on blockchain solution ticks rather than clock time. One tick locks one set of transactions/bids and they are executed. The blockchain network may be configured, e.g. by adjusting the block solution difficulty, such that clock ticks happen frequently enough that they are analogous to clock time, but do not produce the information-time-of-flight disparities as does the current exchange architecture.

Figure 5A:
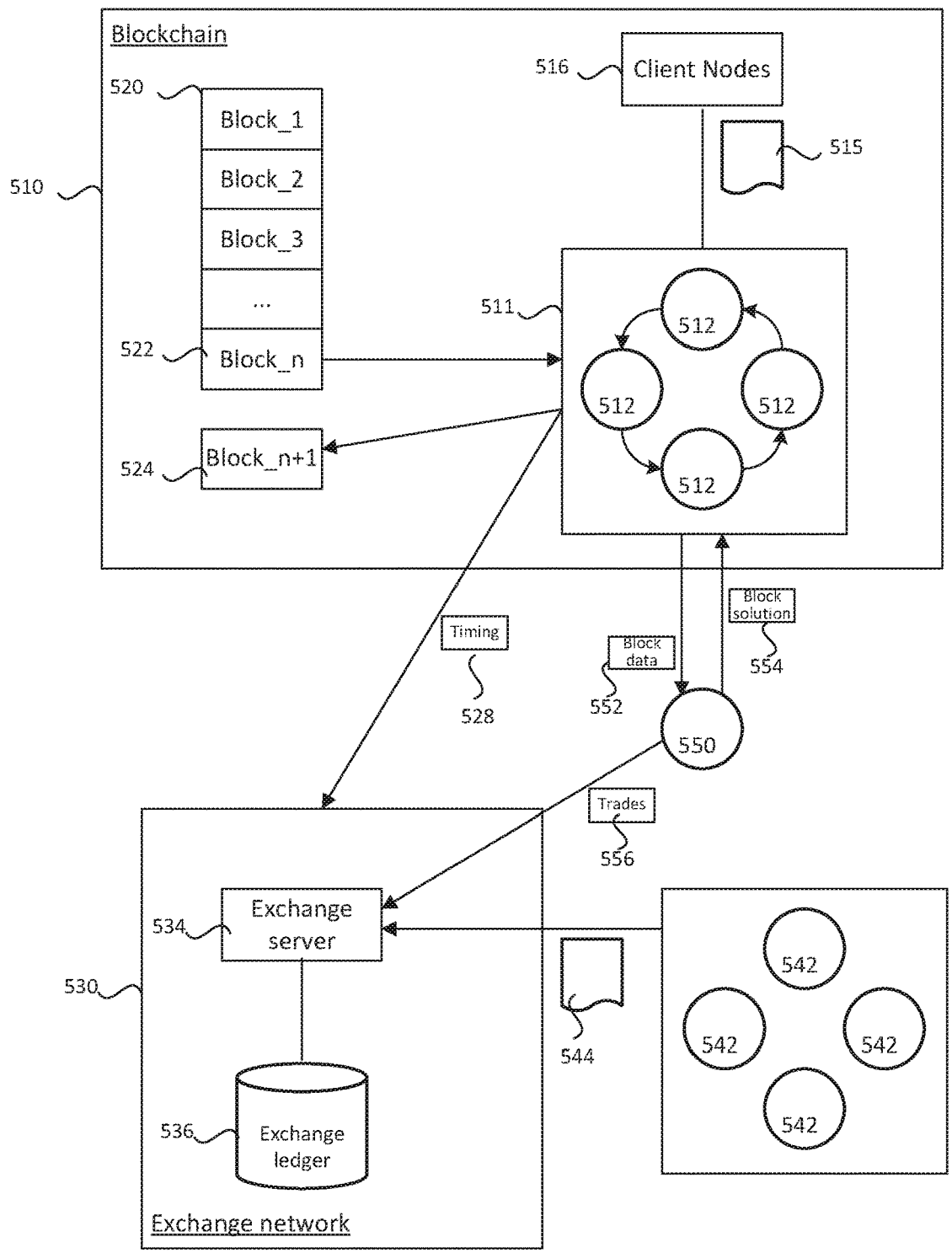
FIG. 5A illustrates an embodiment of an exchange that uses transaction synchronization signals from a blockchain, according to example embodiments.

In FIG. 5A, there is shown an example embodiment of system 500 including an exchange network 530 that cooperates with a blockchain network 510. The blockchain 510 may include a distributed pool of computational resources 511 including a plurality of processing nodes 512. The pool 511 processes transactions 515 typically generated by client nodes 516 into a new block 524 for the blockchain 520. To generate a new block, Block_n+1 524, requires the pool to "solve" the last block, Block_n 522, which typically requires a cryptographic hash of the Block_n header that is less than a target value. This is but one blockchain method and other solution requirements will be apparent to the person skilled in the art. It is common that in many blockchain networks, the process of solving a block is computationally intensive, i.e. requires significant computing capability and energy to generate the cryptographic hash in an operational timeframe.

The exchange network 530 may include one or more exchange servers 534 that maintain exchange records in a datastore or exchange ledger 536. Participants 542 in the exchange generate trades and submit these trades 544 to the exchange servers electronically through an exchange network. Trades may include buy/sell of stock, options, futures, currency, or any commodity, etc. The exchange servers accept the trades 544 and update the exchange ledger 536 according to the rules and policies of the exchange. The exchange network 530 may be implemented on a traditional electronic exchange architecture or may itself be a blockchain network. The participants in the exchange may include one or more direct clients, one or more brokers, one or more high frequency trading platforms, and/or one or more arbitrage platforms. One or more of the participants 542 may be automated trading platforms.

Each participant 542 will have a minimum computational power required to submit trades electronically to the exchange. One or more of the participants 542, such as an automated trading platform, may be located in close physical proximity to the exchange and connected to the exchange server by cabling, while other participants may be located remotely from the exchange and connect to the exchange via a wide area network such as the Internet. The exchange server 534 may provide an interface and/or API by which trades may be submitted to the exchange and by which queries may be submitted for exchange data, ledger status, etc.

It is to be noted that the transactions 515 created by client nodes 516 may be any transactions for the purpose of the blockchain and blockchain methods are rapidly growing in terms of their use as distributed ledgers for all manner of data. In various embodiments, the transactions of the blockchain network 510 may be independent and entirely unrelated to any transactions of the exchange 530. In alternative embodiments, the transactions 515 may be related to the exchange network 530, thus the exchange network 530 may be implemented on the blockchain network 510 and the ledger 536 may be implemented as a cryptographic distributed ledger.

In various embodiments, one or more of the processing nodes 512 of the blockchain network may participate in the exchange network, e.g. by submitting trades to the exchange servers 534. Similarly, one or more of the participants 542 may join the processing pool 511 of the blockchain network 510 and attempt to solve blocks of the blockchain. FIG. 5A shows an example node 550 that is both a participant of the exchange 530 and a member of the processing pool 511. As such, the node 550 receives blocks 552 to be solved and provides block solutions 554. Concurrently, the node 550 is able to send trades 556 to the exchange servers 534. Multiple nodes 550 may exist within the system 500. Additionally, the exchange network may or may not incentivize or require nodes to participate in solving the blockchain as a condition of participation. The exchange operations and chaincode need not be on coincident hardware, supporting systems, or network.

Unlike a conventional exchange that operates on a clock time, the exchange server 534 is configured to receive timing signals 528 from the blockchain network 510 and these timing signals are used to determine when trades will settle, ledger updates are performed, etc. The timing signals, or "ticks", are generated in response to a block solution being generated. The blockchain network can be configured, e.g. by setting the hash difficulty, so that block solutions are generated sufficiently frequently for use as timing signals, but with sufficient randomness that the buyers and sellers do not know exactly when a transaction will close and therefore cannot maliciously manipulate the system. The frequency of the "ticks" can be set by the governing organization of the exchange to obtain an appropriate average "tick" value. This frequency can range from milliseconds, to minutes, to hours as necessary. Thus operating the exchange on a stochastic timer derived from block solution "ticks" reduces or removes the advantages that one or more participants 542 may obtain by virtue of a short signal distance to the exchange server 534.

On the contrary, solving a block may grant a participant a temporary advantage, as only this participant will know when the next solution tick will occur, allowing the participant to potentially make one or more additional bids or withdrawals in the exchange prior to posting the solution and locking all current trades. However, since multiple entities are working towards the solution, holding a known solution does not provide longstanding benefit as would physical location relative to the exchange. If another entity solves the block and posts the solution, the advantage of the first entity will be lost.

Because the trades themselves do not necessarily need to be part of the blockchain; the exchange and its participants could be crunching blocks for other purposes, thus externalizing the cost of blocks for the blockchain network and subsidizing the cost of running the exchange.

Not all participants in the exchange need to crunch blocks and not all nodes that crunch blocks need to be participants of the exchange. The exchange itself does not need to be a blockchain network.

Figure 5B:
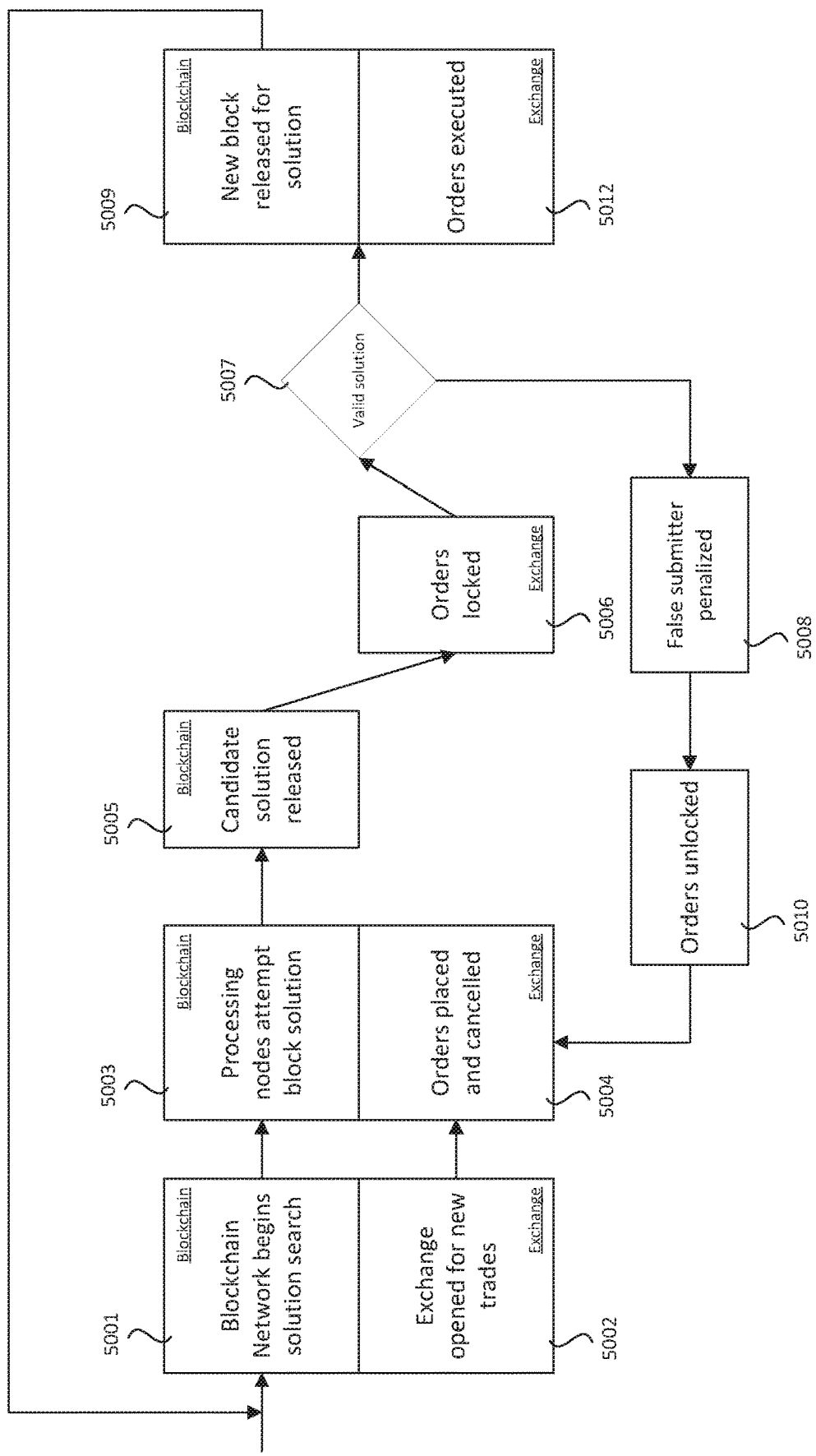
FIG. 5B illustrates a flow diagram of an example method of an exchange that uses transaction synchronization signals from a blockchain, according to example embodiments.

FIG. 5B shows a process flow 5000 for use in an exchange. The process commences with the previous blockchain solution having been verified by consensus algorithm and a new block has been released. The blockchain network 510 commences search for a solution 5001 and the exchange 530 is opened for new orders and trades 5002.

Within the exchange, various entities make and cancel orders, set prices, etc. 5004 but the orders are not finalized or executed, merely held as public record. Entities that are participants of the exchange have the option of attempting to solve the current block 5003 to force the current posted trades to lock.

Eventually, one processing entity solves the current block. The solving entity may or may not be an entity that participates in the exchange. This entity may immediately release the block.

If the solving entity is a participant of the exchange, this entity may hold the block and make a few last minute adjustments to orders before releasing the block. The solving entity is risking that a 2nd entity may solve the block and release the solution in this timeframe thus negating/limiting the advantage. The exchange itself ("disinterested party") may also be attempting to solve the block.

The releasing of the solution 5005 is a timing signal that initiates the consensus phase for the block in the blockchain network. At this time, trades are locked but not processed 5006 in the exchange network.

If the block is not valid 5007, the originating entity will be penalized 5008. This can be in the form of a temporary or permanent ban from the exchange or other penalty. The trades are unlocked 5010 and the hunt for the solution to the block continues 5003/5004.

If the block is valid, the orders are executed with the trades processed at locked prices 5012. A new block is released within the blockchain network 609 and then the process returns to the beginning 5001/5002.

In the event of multiple invalid blocks, the current block may be tossed and a new block may be released.

The above method shows that each valid block solution produces a tick that signals to the exchange to lock and settle the posted trades. In other embodiments, an additional counter may be utilized such that each "tick" may occur on some multiple of block solutions, e.g. 3 block solutions.

The blocks may not be related to the transaction at hand and are merely a source of stochastic timekeeping. Even if the exchange entities are not involved in the block crunching, the coupling of the blockchain network and the exchange network allows stochastic time signals to be provided to the exchange to overcome disadvantages that some participants of the exchange may experience due to signal time disparities. However, exchange participants may gain a temporary advantage by solving blocks and thus knowing when the next trade period will settle. This temporary advantage provides incentive to exchange participants to crunch blocks on behalf of the blockchain network.

While the exchange and blockchain are shown as separate entities, in various embodiments, the transactions that are incorporated into the blocks of the blockchain may be the trades that are posted to the exchange. Thus, the system 500 and process flow 600 may be used to implement a securities exchange on a blockchain, with the costs of processing exchange blockchain being borne by the participants in return for a partial or temporary trading advantage.

In another embodiment, the secondary network may implement an auction. In this embodiment, the blockchain is used as stochastic timer for an online auction process. Rather than incentivizing participants of the secondary network to crunch blocks of the blockchain, the system may require block processing as a condition of participation in the auction. For example, in order to maintain a bid in the auction, the user must devote compute cycles to solving the block. User actions may be locked during block consensus phase. The blocks to be solved can be isolated to a single auction (e.g. allow a single user to dedicate significant compute power to speed up queue) or be shared across multiple auctions (more stochastic and more difficult to modulate by an individual).

In a further example, the stochastic blockchain timer may be used as a countdown timer for an auction.

In a further embodiment, the secondary network may implement a "penny" auction. In this embodiment, the work-function block queue acts as a countdown rather than clock time. For example, the auction may be configured to last a set number of blocks, e.g. 240 blocks. This creates a stochastic rather than deterministic countdown timer, simultaneously increasing excitement while limiting the potential for last second manipulation "sniping" within the bidding process. Optionally, users that contribute to the block processing may purchase actions such as the ability to bid-up the prices, add block(s) to the queue, or modulate the solution difficulty (e.g. solution hash less than X) to modulate the speed of the auction.

To modulate fairness, these actions may only apply to the next block and beyond rather than the current block and all user actions/modifications may be on the public record.

Figure 6A:
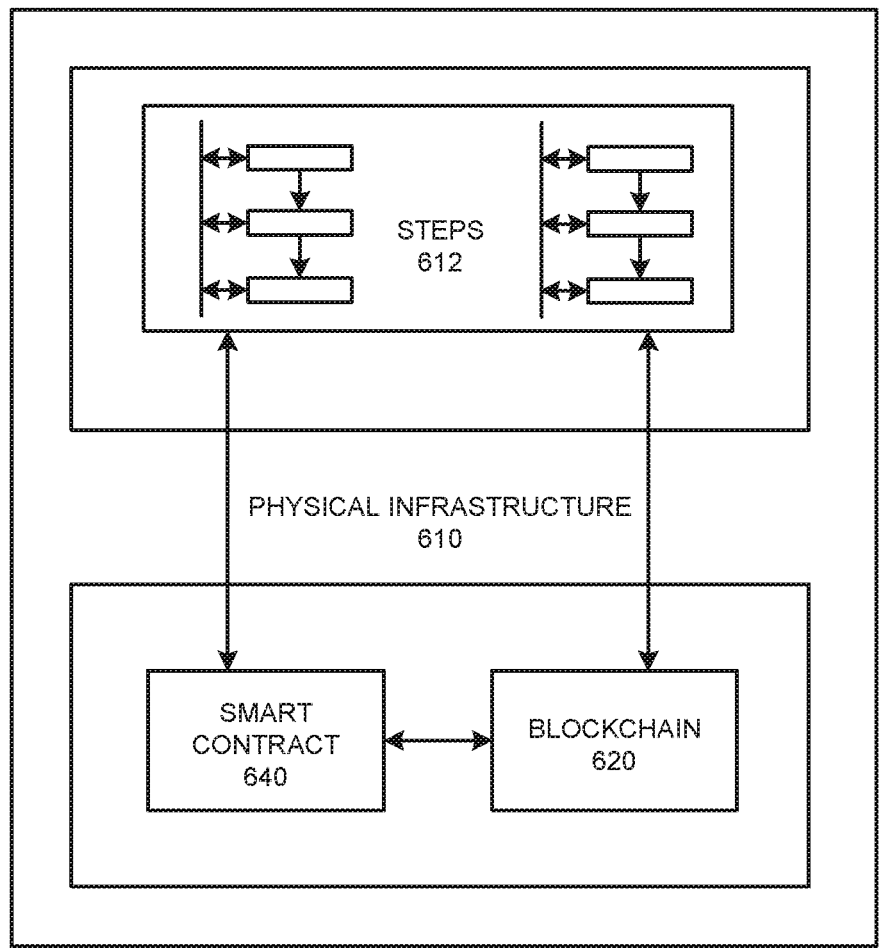
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
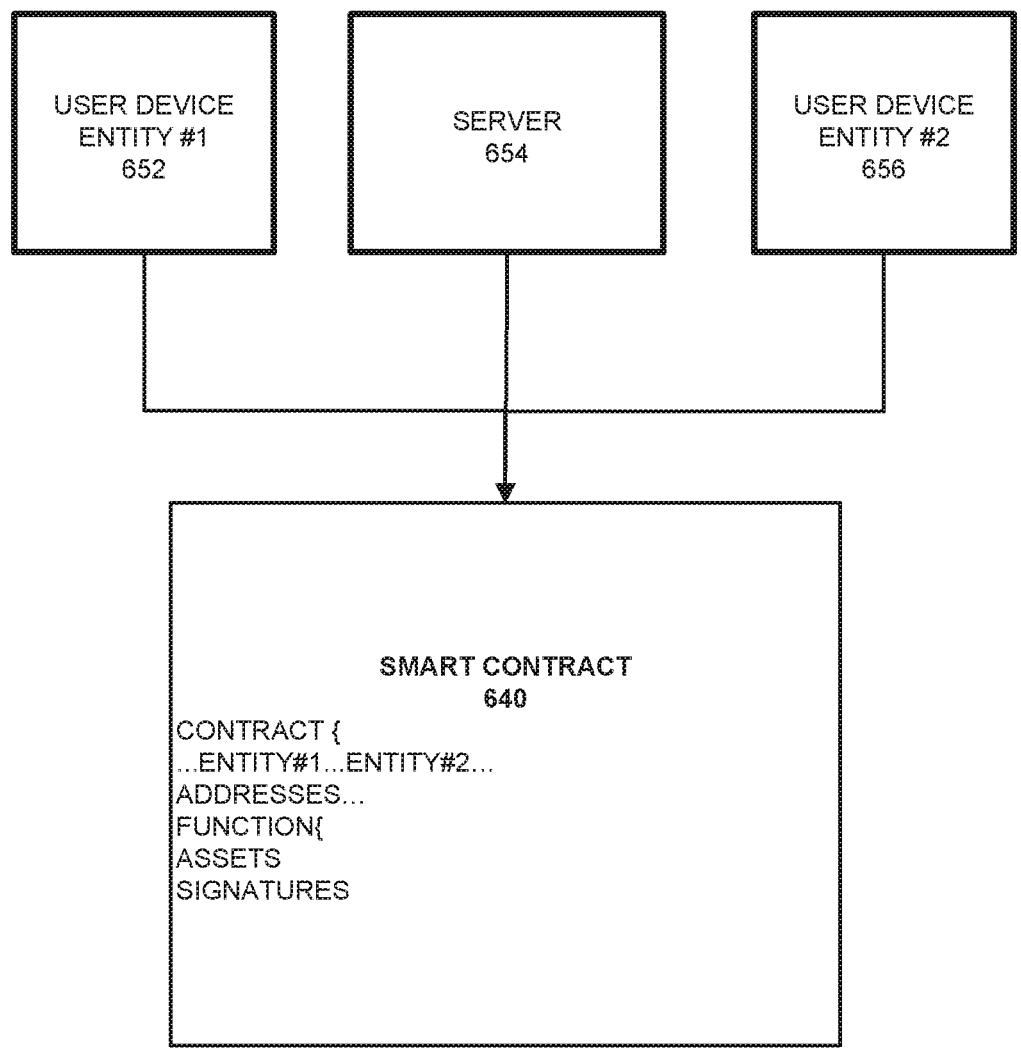
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
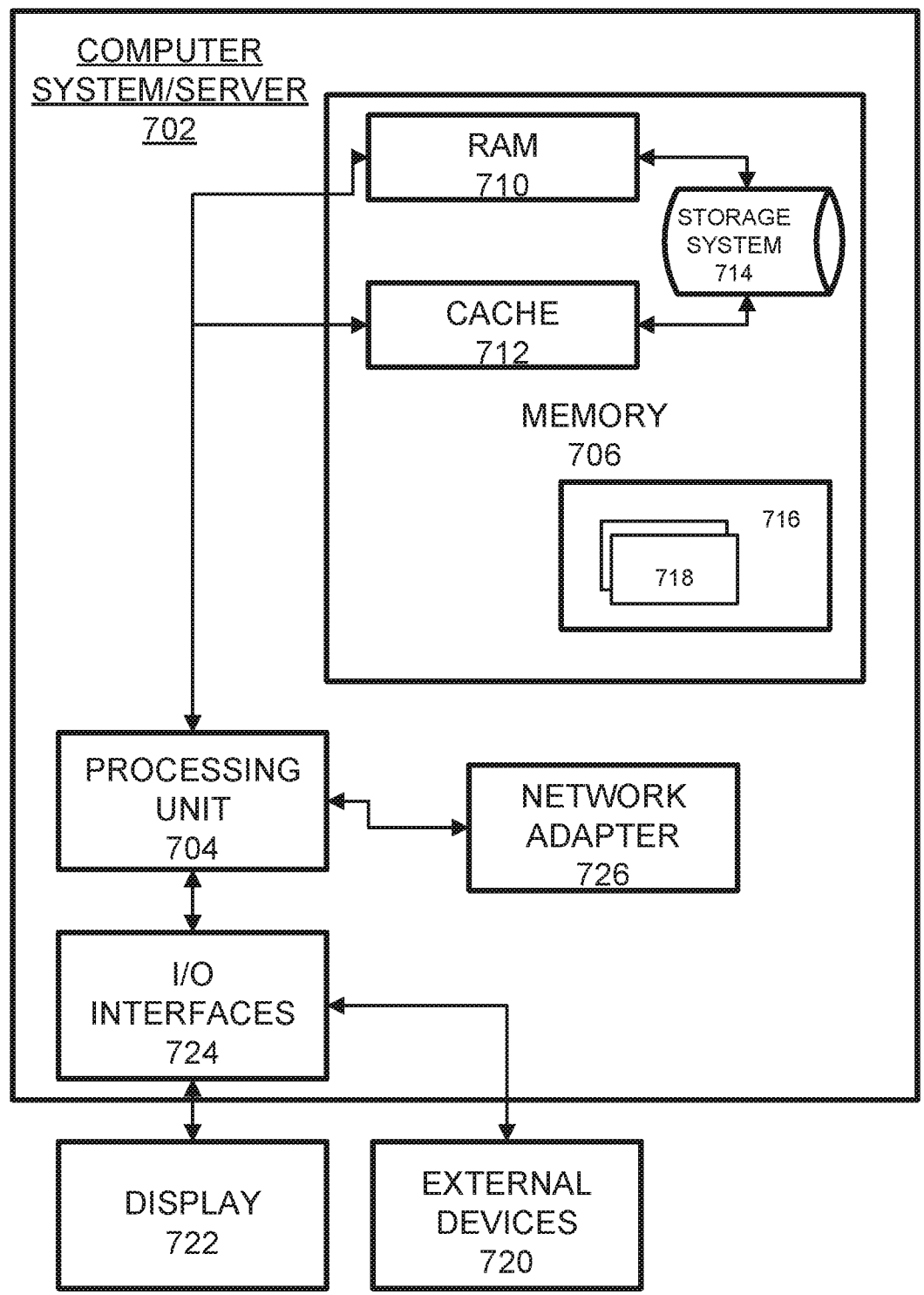
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module.

Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   identifying a block on a blockchain being solved in a blockchain network;
   generating a blockchain tick in response to the identification of the block being solved on the blockchain;
   transmitting a stochastic timing signal corresponding to the blockchain tick from the blockchain network to a secondary network in response to the identification of the block being solved; and
   triggering one or more events in one or more processes of the secondary network from the stochastic timing signal.

2. The method of claim 1 comprising one or more participant nodes of the one or more processes of the secondary network solve the identified block on the blockchain.

3. The method of claim 1, wherein the method further comprises solving the block by a participant node of the secondary network, which provides the participant node with a temporary advantage in the secondary network.

4. The method of claim 1 wherein the one or more processes of the secondary network are unrelated to the blockchain network.

5. The method of claim 1 wherein the secondary network is an exchange, wherein the stochastic timing signal locks posted trade orders for the exchange for execution.

6. The method of claim 1 wherein the secondary network is an auction network and wherein the stochastic timing signal from the blockchain network is used to implement a countdown timer for the auction network.

7. The method of claim 1, wherein the generating comprises generating a plurality of blockchain ticks in response to identifying a plurality of blocks being solved in the blockchain network, respectively, and wherein a frequency of the plurality of blockchain ticks is dependent on a difficulty of a block hash.

8. A system, comprising:
   a processor configured to identify a block on a blockchain being solved in a blockchain network and generate a blockchain tick in response to a block being solved on the blockchain,
   wherein the processor is further configured to:
   transmit a stochastic timing signal corresponding to the blockchain tick from the blockchain network to a secondary network in response to the identification of the block being solved, and
   trigger one or more events in one or more processes of the secondary network from the stochastic timing signal.

9. The system of claim 8 wherein one or more processes of the secondary network are unrelated to the blockchain network.

10. The system of claim 8 wherein the blockchain network comprises a plurality of processing nodes wherein one or more of the processing nodes provides computational resources to generate a plurality of blockchain solutions for the blockchain network and wherein one or more of the processing nodes participate in the one or more processes of a secondary transaction network.

11. The system of claim 10 wherein when the block is solved by a participant of the one or more processes of the secondary network, the participant is provided with an advantage over other participants in the one or more processes of the secondary network.

12. The system of claim 8 wherein the secondary network is an exchange, wherein the stochastic timing signal locks posted trade orders for the exchange for execution.

13. The system of claim 8 wherein the secondary network is an auction network and wherein the stochastic timing signal from the blockchain network is used to implement a countdown timer for the auction network.

14. A non-transitory computer readable medium comprising instructions, that when read by at least one processor, cause the at least one processor to perform a method comprising:
   identifying a block on a blockchain being solved in a blockchain network;
   generating a blockchain tick in response to the identification of the block being solved on the blockchain;
   transmitting a stochastic timing signal corresponding to the blockchain tick from the blockchain network to a secondary network in response to the identification of the block being solved; and
   triggering one or more events in one or more processes of the secondary network from the stochastic timing signal.

15. The non-transitory computer readable medium of claim 14 wherein the method further comprises one or more participant nodes of the one or more processes of the secondary network attempting to solve one or more blocks of the blockchain network.

16. The non-transitory computer readable medium of claim 15 wherein the method further comprises solving the block by a participant node of the secondary network, which provides the participant node with a temporary advantage in the secondary network.

17. The non-transitory computer readable medium of claim 14 wherein the one or more processes of the secondary network are unrelated to the blockchain network.

18. The non-transitory computer readable medium of claim 14 wherein the secondary network is an exchange, wherein the stochastic timing signal locks posted trade orders for the exchange for execution.

19. The non-transitory computer readable medium of claim 14 wherein the secondary network is an auction network and wherein the stochastic timing signal from the blockchain network is used to implement a countdown timer for the auction network.

\* \* \* \* \*